Figure 1:
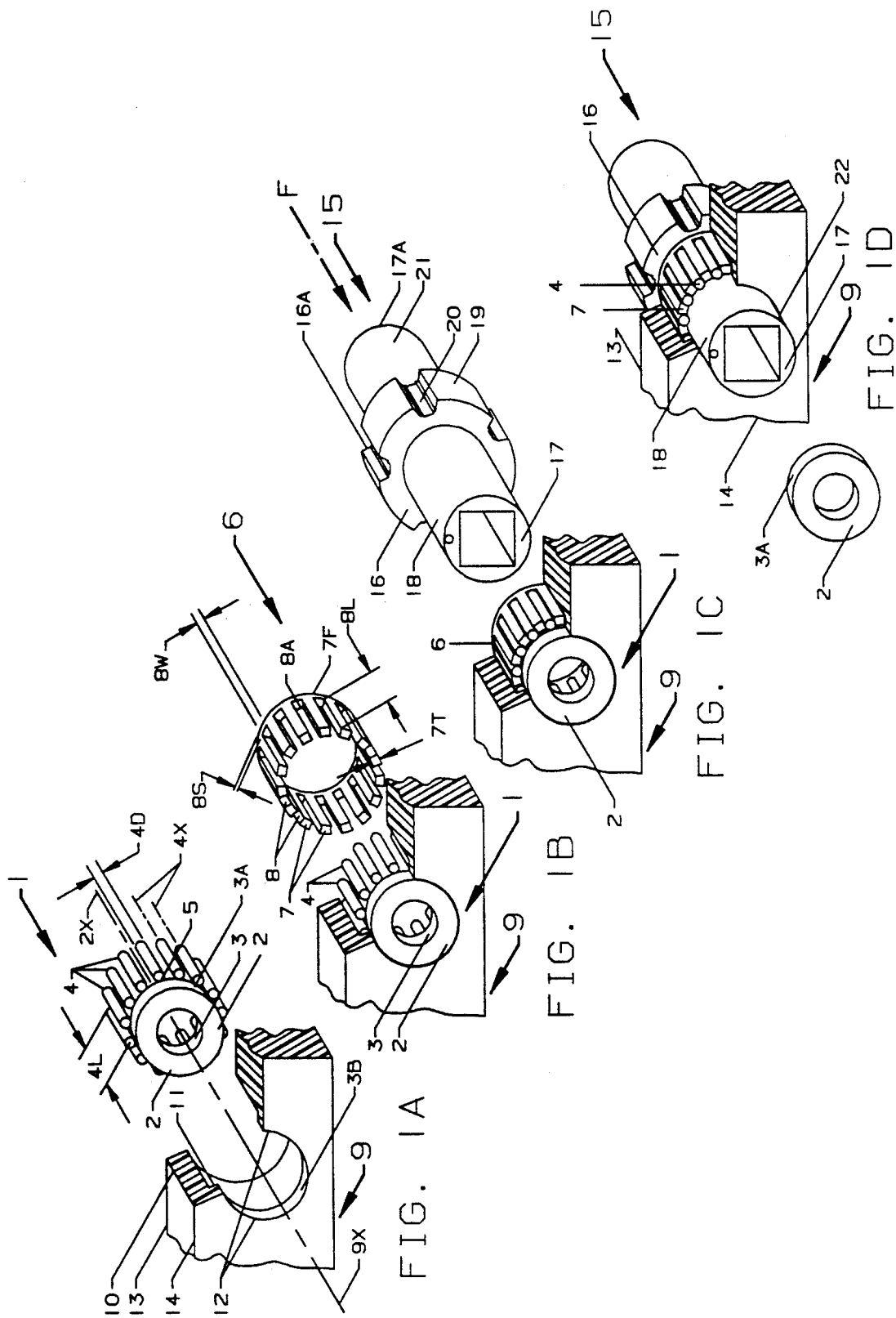

United States Patent [19]

Ferguson

[11] Patent Number: 5,284,285

[45] Date of Patent: Feb. 8, 1994

[54] BEARING ASSEMBLY AND WEB FEED DEVICE INCORPORATING SAME

[75] Inventor: Gregory A. Ferguson, New Bedford, Mass.

[73] Assignee: Precision Handling Devices, Fall River, Mass.

[21] Appl. No.: 850,759

[22] Filed: Mar. 13, 1992

[51] Int. Cl.⁵ .............................................. B65H 20/20
[52] U.S. Cl. ...................................... 226/74; 226/194; 384/560; 384/572
[58] Field of Search .................. 226/74, 75, 170, 194; 384/560, 572, 576, 584; 400/616.1

[56] References Cited

U.S. PATENT DOCUMENTS

| | | | |
|---|---|---|---|
| 3,230,605 | 1/1966 | Schaeffler | 384/560 X |
| 3,387,901 | 11/1968 | Williams | 389/217 |
| 3,944,307 | 3/1976 | Bingle | 389/217 |
| 4,166,660 | 9/1979 | Murphy | 384/448 |
| 4,201,425 | 5/1980 | Freund et al. | 384/448 |
| 4,398,777 | 8/1983 | Murphy | 384/448 |
| 4,602,875 | 7/1986 | Doerr | 384/547 |
| 4,623,270 | 11/1986 | Olschewski | 384/576 |
| 4,679,676 | 7/1987 | King et al. | 192/45 |
| 4,700,443 | 10/1987 | Schalk | 29/148.4 C |
| 4,783,182 | 11/1988 | Caron et al. | 384/523 X |
| 4,822,183 | 4/1989 | Lederman | 384/607 |
| 4,894,897 | 1/1990 | McCloskey | 29/149.5 NM |
| 4,995,520 | 9/1990 | Ferguson | 226/74 |
| 4,995,736 | 2/1991 | Haase et al. | 384/448 |
| 5,022,768 | 6/1991 | Baxter | 384/51 X |
| 5,046,229 | 9/1991 | Lederman | 29/418 |
| 5,046,248 | 9/1991 | Lederman | 29/898.041 |
| 5,059,040 | 10/1991 | Kadokawa | 384/448 |
| 5,068,943 | 12/1991 | Estkowski | 16/18 A |

FOREIGN PATENT DOCUMENTS

| | | |
|---|---|---|
| 1625648 | 1/1972 | Fed. Rep. of Germany. |
| 60-234121 | 11/1985 | Japan. |
| 997007 | 6/1965 | United Kingdom. |
| 2253248 | 9/1992 | United Kingdom. |

Primary Examiner—Lenard A. Footland
Assistant Examiner—Paul T. Bowen
Attorney, Agent, or Firm—Martin Lukacher

[57] ABSTRACT

A relatively low cost, low friction plastic needle bearing assembly uses a unitary plastic circular member with multiple frangibly attached substantially cylindrical needles axially inserted into a cover. A plastic needle separator housing element provides a race and is in axial registration with the frangibly attached needles. A shaft (on which a sprocket of a web feed device or tractor is mounted), upon axial insertion through the member to which the needles are attached, frees the multiple needles from the frangible attachment to the member and ejects the member from the cover leaving the needle bearings captured by the race in the cover.

30 Claims, 3 Drawing Sheets

BEARING ASSEMBLY AND WEB FEED DEVICE INCORPORATING SAME

DESCRIPTION

This invention relates to bearings and particularly to a needle bearing assembly using molded plastic elements with is constructed from frangible elements to provide relatively low torque bearings for sprockets or pulleys, especially feed device, such as a paper drive tractor.

The use of bearings to enhance rotational or lateral motion between two members is well known. So-called sleeve-type or sliding bearings are generally used in relatively low cost applications if their relatively high frictional characteristics can be tolerated. Virtually frictionless, high precision bearings, such as ball bearings and needle bearings of all-metallic construction are of relatively high cost and frequently require precise and complex installation of the two rotationally or laterally translatable members. Such precision bearings are relatively expensive, in part, due to exacting mechanical assembly of their components.

Various methods have been proposed to modify component assembly of bearing elements, so as to either reduce the assembly cost or to provide particular functional features for a bearing in a particular application. Doerr et al., U.S. Pat. No. 4,602,875, dated Jul. 29, 1986 describes a combined ball bearing, pulley and shield assembly wherein said assembly is temporarily unitized prior to installation on a shaft support. Upon installation of the shaft, initial rotational force applied between the pulley and the shaft fractures a series of frangible molded bonds between the molded pulley and the metal shields, thereby allowing free subsequent relative rotation between the pulley and the shaft while simultaneously providing metal shields for protecting the balls and races of the ball bearing. Olschewski et al., U.S. Pat. No. 4,623,270, dated Nov. 18, 1986, describes a molded plastic cage for accepting and rotatably retaining cylindrical or spherical roller bearing elements, thereby reducing the tooling costs associated with fabrication and assembly of bearings with metal cages.

King et al., U.S. Pat No. 4,679,676, dated Jul. 14, 1987, describes an initially unitary molded plastic cage body for use in an overrunning clutch with clutch support portions. The moldable plastic material is used to obtain desirable frictional properties, and the initially unitary structure of the cage body facilitates installation of metal wedging elements, which upon their installation fracture certain connector portions of the initially unitary molded plastic cage body, thereby allowing independent operation of clutch support portions.

Lederman, U.S. Pat. No. 4,822,183, dated Apr. 18, 1989, describes thrust-type ball bearing employing a unitary molded plastic cage and seal unit that includes an annular separator and a pair of seals frangibly molded to the separator. Upon assembly of the bearing, the frangibly molded seals break away from the annular separator.

Lederman, U.S. Pat. No. 5,046,229, dated Sep. 10, 1991, describes a method for manufacturing and assembling a control car roller clutch, wherein a removable carrier ring frangibly and temporarily retains control cars and journal blocks. The carrier ring is broken away and removed upon assembly of the clutch.

In Lederman, U.S. Pat No. 5,046,248, dated Sep. 10, 1991, proposes a plastic taper thrust roller bearing, wherein plastic taper rollers are frangibly molded to an annular separator. A special assembly tool is used to provide a sufficient multidirectional force between the tapered rollers and one bearing race so as to pivot the rollers by an angle of about 90 degrees, thereby fracturing the frangibly attached rollers from the annular separator. A different special assembly tool would be required to provide the combined axial and radial forces needed for pivoting or tipping rollers of different sizes or shapes to affect fracturing of the frangibly attached rollers from the separator.

While the above-cited prior art contemplates the use of plastic components in bearings either to ease the assembly procedure of bearings, or to reduce the cost of components, or to provide particular frictional properties or protective features, and even temporary and frangible joining of components during at least part of the bearing assembly process, the problem remains of providing a bearing assembly which is easy to construct, without special tools and especially an assembly which can employ many small, easily broken elements, such as needle bearings.

It is therefore, an object of the present invention to provide improved bearing apparatus which can include plastic needle bearings and which is of relatively low cost to construct and provides low friction support of a running member, such as a shaft.

Another object of this invention is to provide an improved bearing assembly where needle bearings are attached at one of their ends to a holding ring or another part of the assembly from which they are detached by the shaft which the bearings support when the shaft is inserted axially along the bearings through the ring or other part of the assembly while the bearings are captured in a housing or race.

Still a further object of this invention is to provide improved web feed devices, especially tractors, having plastic needle bearings assembled and installed in the devices frames automatically upon assembly of the devices.

Another object of this invention is to provide improved plastic needle bearings suitable, generally for use in various applications, such as with associated gear shafts.

In accordance with the invention, a unitary element of needles is frangibly attached to a circular member or ring, and disposed in a unitary needle separator housing element or race. Both elements are axially and slidably translated into a cover element, such as the bore in a frame wherein the race and needles are captured. A shaft member, which is journalled by the bearings, severs the frangibly attached needles from the circular member and ejects said circular member from said cover element when the shaft is axially and slidably inserted through the cover. More broadly the needles may be molded integrally with and frangibly attached to another part of the needle bearing assembly and separated upon assembly of the parts to form the needle bearing assembly.

Briefly described, a plastic bearing assembly according to an embodiment of the invention has an annular member or ring with multiple bearing members, such as needles, frangibly attached to the ring along a circumferential outer edge thereof. A separator housing or race is axially and registratively oriented with the bearing members. A cover, which may be the shaft opening in the frame or wall in which the bearing assembly is mounted, axially and slidably accepts and retains the ring with needles. The race holds the needles against the cover and separates the needles. The shaft is axially insertable through the race while the needles are captured in the cover. Shaft strikes the circular member, breaks the attachments, freeing the multiple needles from said circular member, and ejecting said circular member from said cover. The needles provide a low friction journal for the shaft. The circular member may be molded integrally with another part of the assembly and severed during the assembly process, thereby simplifying and reducing the labor time for the assembly process.

An advantage of this invention is a needle bearing assembly of relatively low cost and low friction.

Another advantage of this invention is that all elements of the needle bearing assembly can be made of molded plastic materials.

A further advantage of this invention is to provide for simplified axial assembly of a needle bearing, thereby obviating special assembly tools.

Still a further advantage of this invention is that the bearing accepting and retaining cover can be a framing member of a device, or can be a cover attached to a framing member.

Still another advantage of this invention is that a gear shaft or a pulley shaft axially inserted into the bearing firstly serves to free the needles from their attachment to a ring, secondly to eject the circular member from the bearing, and thirdly to journal the shaft, which may be a rotatably driven element.

Another advantage is to provide relatively low cost and low friction plastic needle bearing which can be constructed by successive axially directed assembly steps without special assembly tools.

Figure 2:
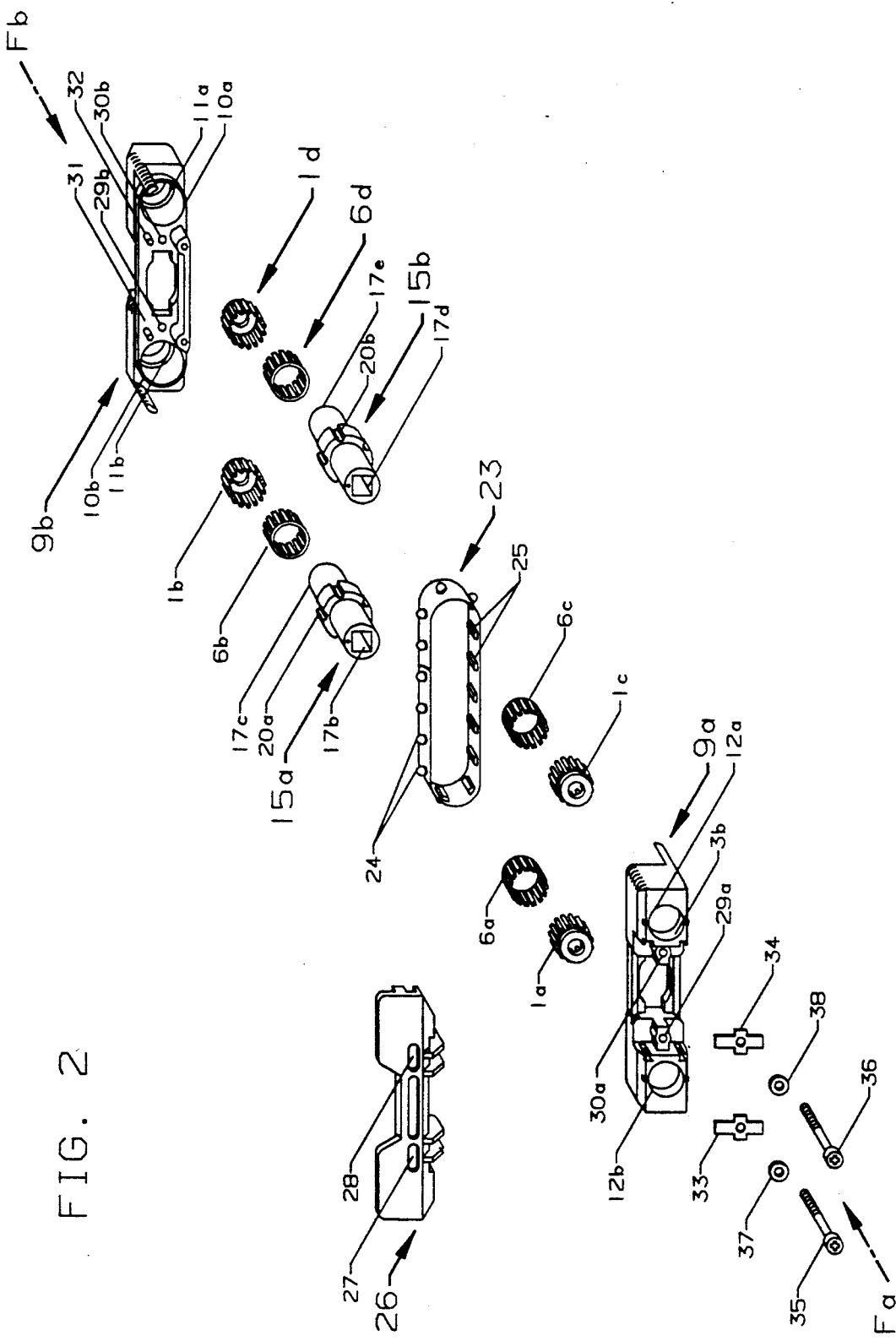
Figure 3:
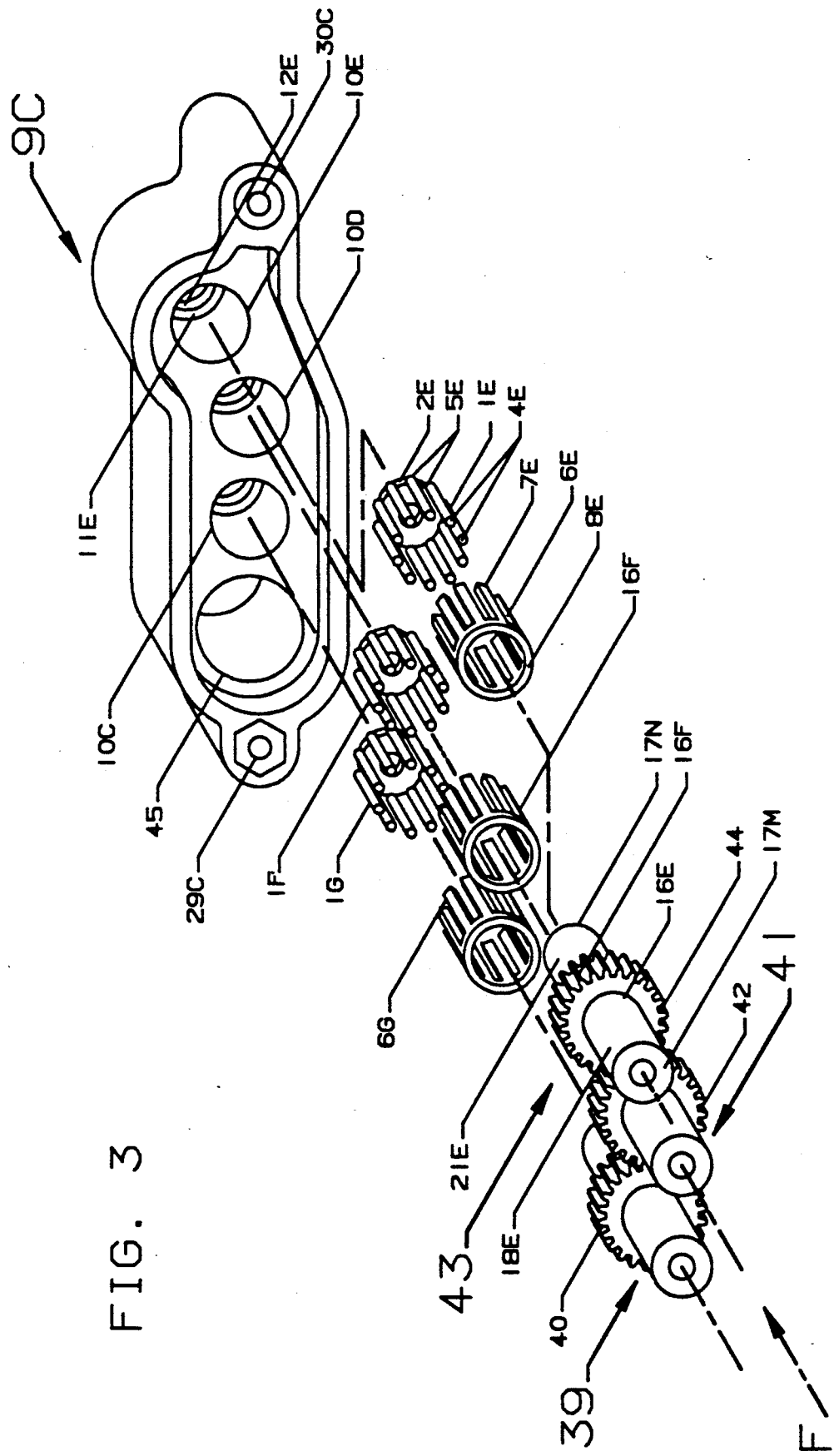

The foregoing and other objects and advantages of the invention will become more apparent from a reading of the following description with reference to the accompanying drawings, in which:

FIGS. 1A-D are exploded views of a plastic needle bearing assembly of the invention in process of construction;

FIG. 2 is an exploded view of a web feed tractor, incorporating plastic needle bearing assemblies of this invention; and FIG. 3 depicts an exploded view of a gear mechanism in conjunction with plastic needle bearing assemblies according to the invention.

Referring to FIGS. 1A-D, there is shown the assembly sequence of a bearing according to the present invention. Like parts are assigned like numerals.

In FIG. 1A, an element comprising a circular member (an annulus or ring) 2 with multiple needles 4 frangibly attached to its outer circumferential edge 3a is generally indicated at 1. The circular member 2 is of substantially uniform thickness and has substantially cylindrical multiple needles 4 frangibly attached at 5 to at least a fraction of its outermost circumferential edge 3a. Needles 4, each of diameter 4(d) and length 4(l) are substantially parallel with the central axis 2x of circular member 2. Element 1 is preferably a unitary molded element made from moldable plastics selected from the group consisting of polypropylenes and polyacetals. The relative desirable strength of the frangible attachment 5 of needles 4 to circumferential edge 3a of the ring 2 is dependent upon several factors, including the particular type of moldable plastic, the molding process and the dimensions of needles 4 and the ring 2. In any event, the relative desirable strength of the frangible needle attachment is obtained for unitary molded element 1 by frangibly disposing needles 4 over that width fraction of a circumferential band of circular member 2 which defines the edge 3a which ensures at one the mechanical integrity of unitary element 1 during its fabrication, storage, handling and installation, as well ensuring the severing of the frangible attachment between needles 4 and ring 2 upon installation in a suitable cover element by application of an axially directed force.

A outer, cover element, generally indicated at 9, serves to accept and retain element 1. The needles bear against the inside periphery of the cover element. The cover element 9 can be an integral part of a structural framing member of a device, such as a side plate or frame of a tractor (see FIG. 2), or it can be a separate member fixedly attached to a structural framing member of device. Cover element 9 has generally parallel, planar side surfaces 13 and 14 defining the depth or thickness of cover 9. Concentric cylindrical openings 10 and 12 about an axis 9x extend substantially orthogonally to side surfaces 13 and 4 through the body of cover 9, with cylindrical opening 10 being larger in diameter than concentric cylindrical opening 12. The difference in diameters between concentric cylindrical openings 10 and 12 constitutes a flange surface in the form on edge or flange step 11. Common axis 9x of concentric openings 10 and 12 is substantially parallel to axis 2x of element 1. Cylindrical opening 10 is sized such that it will axially and slidably accept the outermost imagined circular circumference of the array of the multiple frangibly attached needles 4 of element 1, and concentric cylindrical opening 12 is sized so as to axially and slidably accept circular member 2 of element 1, with outside circumferential band 3a of element 1 substantially slidably disposed inside the circumferential wall 3b of cover element 9. The depth or thickness of cylindrical opening 10 in element 9, extending from side surface 13 to flange edge 11, is chosen such as to at least equal the sum of length 4(l) of the needles 4 and the thickness or depth of a support ring 8s of element 6 in FIG. 1B. Cover element 9 is preferably a molded plastic element made from moldable plastics selected from the group consisting of polypropylenes and polyacetals, with suitably molded or machined concentric cylindrical openings 10 and 12 and flange edge or flange step 11 disposed about a common central axis 9x.

In FIG. 1B is depicted the element 1, intended to be shown axially and slidably installed in cover element 9. Frangibly attached needles are shown slidably resting against flange edge or flange step 11 of cover element 9. A plastic cage-like needle separator housing element or race is generally indicated at 6, comprising multiple finger-like axial projections 7 circumferentially and uniformly separated from one another by slots 8, with the length 8(l) of the finger-like projections 7 and of slots 8 being at least equal to the length 4l of the needles 4 in element 1. Width 8w of slots 8 is designed such that slots 8 can axially and slidably engage needles 4 of element 1, while finger-like axial projections 7 of element 6 axially and slidably insert as needle separators for needles 4 of element 1. The radial width or thickness 7t of both the finger-like axial projections 7 and the slots 8 is fractionally thinner than the needle diameter 4d in element 1; the fraction preferably ranging from 0.75 to 0.95 of needle diameter 4d. Needle separator housing element 6 is structurally supported by a ring-like support, the width of which is shown as 8s, extending axially form the base of slots 8 to the base 7f of the finger-like axial projections 7 of element 6, and extending radially by the width or thickness 7t of axial projections 7. Needle separator housing element 6 is preferably a molded plastic element made from moldable plastics selected from the group consisting of polypropylenes and polyacetals, with suitably molded or machined slots 8, so as to ensure slidable, low-friction engagement between element 6 and needles 4 frangibly attached to circular ring 2 of element 1.

FIG. 1C shows needle separator housing element 6 in intended axially slidable engagement with element 1, whereby the finger-like projections 7 of element 6 are indicated as resting against the same flange edge or flange step 11 of cover element 9 (see FIG. 1A) that serves as one axial stop for the needles of element 1 (see (FIG. 1B). A cylindrical, inner element, generally indicated at 15, is a shaft which has a first cylindrical section 18 with an associated substantially planar end face 17 and a second cylindrical section 21 with an associated substantially planar end face 17a. Separating the cylindrical sections 18 and 21 is a pulley 19 with substantially planar end faces 16 and 16a. The pulley 19, as depicted, has axial sprockets 20 substantially uniformly spaced along its radial perimeter. Cylindrical section 18 of shaft 15 has a diameter such as to axially and slidably translate through the base 7f and along the inside of finger-like axial projections 7 of needle separator housing element 6 in FIG. 1B. When planar end face 17 of axially and slidably translated shaft section 18 contacts the needle-like planar face of circular member 2, a brief application of an axial force F, indicated by a dashed line and open arrow in FIG. 1C, severs the frangible attachment between needles 4 and ring 2. Member 2 thereby becomes ejectable through concentric circular opening 12 from cover element 9, as shown in FIG. 1D.

FIG. 1D shows the assembled needle bearing assembly in cover element 9. Circular member 2 is shown ejected from cover element 9, due to axial force F on shaft 15 having severed the frangible attachment 5 between needles 4 and circumferential band 3a of circular member 2 (see FIG. 1A). Needles 4 are now free and rotatably disposed within the slots 8 of needle separator housing element 6, being axially and slidably retained by flange edge or flange step 11 of cover 9 on one axial needle end and by the base of slots 8 of needle separator housing element 6 on the other axial needle end. Needles 4 are radially and rotatably retained between the surface of cylindrical opening 10 in cover element 9 and by the surface of cylindrical shaft segment 18 of shaft 15. A length fraction 22 of cylindrical shaft section 18 is indicated as projecting beyond side surface 14 of cover element 9 to facilitate subsequent installation of additional elements, such as gear drives, revolution counters and the like. Pulley end face 16 of shaft 15 retains needle separator housing 6 axially inside cylindrical opening 10 of cover element 9. Cylindrical shaft element 15 can be a drive shaft or an idler shaft, and is preferably a molded plastic element made from moldable plastics selected from the group consisting of polypropylenes and polyacetals.

FIG. 2 is an exploded view of elements of a web feed device or tractor, using needle bearings according to the present invention. Each of two cover elements 9a and 9b (the tractor side frames) have two smaller concentric cylindrical openings 12a and 12b and two larger concentric openings 10a and 10b. Elements 9a and 9b are, upon assembly, registratively engaged by registration pins 31 and 32 in cover element 9b and by respective registratively located openings in cover element 9a (not shown). Assembly occurs via screws 35 and 36, washers 37 and 38, flat spring elements 33 and 34, holes 27 and 28 in lid element 26, holes 29a and 30a in cover 9a and threaded holes 29b and 30b in cover 9b. The design and function of lid 26 in conjunction with flat spring elements 33 and 34 has been disclosed in Ferguson, U.S. Pat. No. 4,955,520, dated Sep. 11, 1990.

Each of elements 1a–d comprises a ring-like circular member with substantially cylindrical needles frangibly attached to its outermost circumferential band, as indicated and described in FIG. 1A. Axially and radially slidable insertion of elements 1b and 1d in to respective cylindrical openings 10b and 10a of cover element 9b axially translates the circumferentially mounted needles against the flange faces or flange edges 11b and 11a, respectively, insertion of elements 1a and 1c into identical cylindrical openings (not shown) of cover element 9a occurs likewise. Cage-like needle separator housing elements (races) 6b and 6d are axially and slidably translated and registratively inserted into respective elements 1b and 1d, contained in cylindrical openings 10b and 10a, respectively. Cage-like needle separator housing elements (races) 6a and 6c are likewise axially and slidably translated and registratively inserted into respective elements 1a and 1c, now contained in cover element 9a. Cylindrical sprocket pulley shafts 15a and 15b are axially and slidably inserted and translated through ring-like support openings in needle separator housing elements 6b and 6d, respectively, said elements being now retained in cylindrical openings 10b and 10a, respectively, of cover element 9b. A belt, generally indicated at 23, has lugs 25 on its underside, said lugs being engaged by grooves 20a and 20b of respective sprocket pulley shafts 15a and 16b, at least one of said shafts being a drive shaft. Belt 23 has regularly spaced pins along its outer surface, such pins serving to lineraly translate a perforated web by releaseably engaging the perforations in said web. Belt 23 is translated axially and registratively onto the sprocket pulley shafts 15a and 15b so as to engage lugs 25 in grooves 20a and 20b, respectively.

With screws 35 and 36, washers 37 and 38, flat spring elements 33 and 34, and lid 26 assembled on cover element 9a, and with cover element 9a retaining inserted needle bearing elements 1a and 6a and 1c and 6c, respectively, cover element 9a is translated axially toward cover element 9b, thereby registratively located openings in cover element 9a (not shown). An axial force Fa or Fb on one cover element 9a or 9b against the second cover element is transferred to planar end faces 17b, 17c and 17d, 17e of sprocket pulley shafts 15a and 15b, respectively, thereby severing the frangible attachment between the needles and circular member of each of the elements 1a, 1b, 1c and 1d, and providing for ejection of associated circular members from these elements through concentric cylindrical openings 12a and 12b in cover element 9a and through like openings in cover element 9b (not shown), as indicated in more detail in FIG. 1D.

Final assembly of the web feed device with needle bearing assembly according to the present invention in accomplished by fastening screws 35 and 36 in threaded holes 29b and 30b of cover element 9b, and by attaching suitable drive means to at least one sprocket pulley shaft, said shaft being dedicated to projecting axially beyond the outermost sidewall of either cover element 9a or cover element 9b, so as to facilitate such attachment of suitable drive means.

Thus, FIG. 2 provides an exploded view of elements of a web feed device, incorporating needle bearing assembly according to the present invention. The axial symmetry of the needle bearing elements about sprocket pulley shafts 15a and 15b substantially enhances the assembly process of a web feed device. All major needle bearing elements may be fabricated of moldable plastic materials selected from the group consisting of polypropylenes and polyacetals.

FIG. 3 depicts elements of a needle bearing according to the present invention in conjunction with a gear assembly. A cover element generally indicated at 9c has cylindrical openings 10c, 10d and 10e intended to accept axially and slidably the frangibly deposed needle elements 1g, 1f and 1e, respectively, as well as cage-like needle separator housing elements 6g, 6f and 6e, respectively, inserted axially and slidably in registration with said needle elements contained in said cylindrical openings of cover element 9c. Each of the cylindrical openings 10c, 10d and 10e in cover element 9c has a concentric cylindrical opening of a diameter smaller than the diameters of openings 10c, 10d and 10e. To simplify the drawing of FIG. 3, only one such smaller diameter concentric cylindrical opening is denoted at 12e in conjunction with larger diameter concentric cylindrical opening 10e. The difference between diameters 10e and 12e constitutes a flange step or flange edge 11e, which is contacted by the frangibly attached needle ends 5e of needles 4e and by the finger-like ends 7e of needle separator housing element 6e. Circular member 2e, to which needles 4e are frangibly attached, has a diameter such that member 2e can axially and slidably fit into concentric cylindrical opening 12e of cover element 9c. Cover element 9c has additional cylindrical opening 45, intended for auxiliary purposes, and holes 29c and 30c which may serve to registratively align cover element 9c with an opposing cover element (not shown), or may be threaded holes for accepting threaded screws used to fasten an opposing cover element (not shown) to cover element 9c.

Cylindrical shaft elements indicated generally at 39, 41 and 43 have rigidly deposed associated gear elements 40, 42 and 44, respectively, with at least one of said shafts and associated gear element being rotationally driven by a drive mechanism (not shown). Each cylindrical shaft element is axially translated so as to slidably penetrate the cylindrical opening of the respective needle separator housing element until the planar end face of each shaft contacts the planar surface of the respective circular member of the respective frangibly attached needle element. To simplify the drawing of FIG. 3, only cylindrical shaft element 43 and associated rigidly deposed gear element 44 are denoted in detail: cylindrical shaft element 43 has one cylindrical surface 18e extending axially from substantially planar sidewall 16e of gear 44 to substantially planar shaft end 17m, and another cylindrical surface 21e extending axially from substantially planar sidewall 16f of gear 44 to substantially planar shaft end 17n. Cylindrical surface 21e is axially and slidably inserted through the opening of ring-like support 8e of needle separator housing element 6e and through the inner opening of the needle assembly comprising needles 4e frangibly attached to the circumferential band of circular member 2e of element 1e. As planar shaft end 17n contacts the inner planar surface of circular member 2e of element 1e, application of an axial force F (shown dashed with open arrow) between cylindrical shaft element 43 and cover 9c severs the frangible attachments at 5e between needles 4e and circular member 2e, thereby freeing needles 4e so as to become rotatably functional as needle bearings between the surface of cylindrical opening 10e of cover element 9c and the cylindrical surface 21e of shaft element 43, while simultaneously axially ejecting circular member 2e of the former frangible needle element 1e through concentric cylindrical opening 12e of cover element 9c (not shown).

Upon assembly of cylindrical shaft elements 39 and 41 with associated respective gear elements 40 and 42 in like manner, gear elements 40, 42 and 44 function as a gear mechanism to provide, for example, rotational or lateral means to transport webs in a web feed device as depicted in FIG. 2.

In FIG. 3, cover element 9c, frangible needle elements 1e, 1f and 1g, and needle separator housing elements 6e, 6f and 6g are preferably fabricated by molding from plastics selected from the group consisting of polypropylenes and polyacetals. Shaft elements 39, 41 and 43 and associated gear elements 40, 42 and 44 are also preferably fabricated by molding from plastics selected from the group consisting of polypropylenes and polyacetals. Alternatively, shaft elements 39, 41 and 42 may be fabricated of plastic or metal, and associated gear elements 40, 42 and 44 may be fabricated of metal or plastic.

Thus, FIG. 3 depicts a substantially axially assembled needle bearing assembly in conjunction with a gear assembly, comprising a molded plastic cover element with multiple concentric cylindrical openings and associated means; multiple unitary molded plastic elements, each element comprising needles frangibly deposed on a circumferential band of a circular member, axially and slidably translatable into the cylindrical openings of said cover element; multiple unitary molded plastic needle separator housing elements, each such element being axially and slidably translatable to registratively engage and retain the frangibly attached needles deposed on each of said circular members; and multiple cylindrical shaft members, each shaft member having an associated rigidly deposed gear element, and each of such shaft members being axially and slidably translatable through each of said separator housing elements and each of said frangibly attached needle elements, so as to sever by axial force the frangible attachment between the needles and each of the circular members and to eject from the cover the said circular members.

The invention of a substantially axially assembled needle bearings utilizing molded plastic elements, has been described in detail with particular reference to certain preferred embodiments thereof. Variations and modifications in the herein described needle bearing, sequence of needle bearing assembly steps, and use of such needle bearings in web feed devices, within the spirit and scope of the invention will undoubtedly suggest themselves to those skilled in the art. Accordingly, the foregoing description should be taken as illustrative and not in a limiting sense.

I claim:

1. A plastic bearing assembly comprising a unit having a circular annular member with multiple rollable bearing members frangibly attached thereto, an outer element having a hole therethrough in which said unit is received by axially and slidable inserting said circular member with its said attached bearing members, and an inner element disposed in said hole and inside said bearing members, said inner elements having a diameter greater than the inside diameter of said circular member whereby said inner element engages said circular member when axially inserted through said hole in said outer element upon assembly freeing said bearing members from said circular member by axial force and ejecting said circular member from said outer element.

2. The bearing assembly according to claim 1, wherein said bearing members are multiple needles frangible attached to a circumferential edge of said circular member which is disposed inside said hole in said outer element and said unit is a unitary molded plastic element.

3. The bearing assembly according to claim 2, wherein said circular member has a central axis substantially parallel to the central axis of each of the multiple needles frangibly attached to its circumferential edge.

4. The bearing assembly according to claim 1, wherein each of said multiple bearing members is of substantially cylindrical shape.

5. The bearing assembly according to claim 1, further comprising a separator housing element having axial openings, said bearing members being axially and registratively oriented in said axial openings and said outer element axially and slidably accepting and retaining said circular member with its said attached bearing members and said separator housing element in said hole in said outer element, and said separator housing element being a unitary molded plastic element providing a race for said bearing members.

6. The bearing assembly according to claim 5, wherein said separator housing element has a ring-like support with an opening.

7. The bearing assembly according to claim 5 wherein said hole in said outer element has at least one first cylindrical opening of a first diameter to slidably accept and retain said multiple bearings frangibly attached to the circumferential edge of said circular member while disposed in said separator housing element, and said hole in said outer element has a second cylindrical opening of a second diameter smaller than said first diameter and coaxial with said opening of said first diameter, said second cylindrical opening being concentric with said circular member when said unit is disposed in said hole, said concentric second cylindrical opening slidably accepting said circular member with said first diameter and said second diameter defining a flange surface against which said bearings and said separator element are disposed.

8. The bearing assembly according to claim 7, wherein said inner element is a cylindrical shaft, said bearing members are needles, said shaft being axially inserted into said outer element through said needle separator housing element, said shaft is subjected to a temporary axial force sufficient to free each of the multiple frangibly attached needles from said circular member and to eject said circular member from said outer element through said concentric second cylindrical opening of said hole in said outer element.

9. The bearing assembly according to claim 5, wherein said unit, said separator housing element, said outer element and said inner element are made from moldable plastics selected from the group consisting of polypropylenes and polyacetals.

10. The bearing assembly according to claim 5, wherein said axially insertable inner element is axially inserted into said hole in said outer element through an axial opening in said separator housing element.

11. The bearing assembly according to claim 1, wherein said outer element is a molded plastic cover element.

12. The bearing assembly according to claim 11 further comprising a frame member at least a part of which provides said cover element.

13. The bearing assembly according to claim 12, wherein said molded plastic cover element is integrally molded as part of said frame member.

14. The bearing assembly according to claim 11 further comprising a frame member to which said cover element is attached.

15. The bearing assembly according to claim 1, wherein said hole in said outer element has at least one first cylindrical opening of a first diameter to slidably accept and retain said multiple bearings frangibly attached to the circumferential edge of said circular member, and said hole in said outer element has a second cylindrical opening of a second diameter smaller than said first diameter, said second cylindrical opening being concentric with said circular member when said circular member is disposed therein, said concentric second cylindrical opening slidably accepting said circular member, with said first diameter and said second diameter defining a flange surface against which said bearings are disposed when said bearings are in said opening.

16. The bearing assembly according to claim 1 wherein said axially insertable inner element is a cylindrical shaft.

17. The bearing assembly according to claim 16, wherein said cylindrical shaft is a sprocket or pulley shaft.

18. The bearing assembly according to claim 16, wherein said cylindrical shaft is a gear shaft.

19. The bearing assembly according to claim 16, wherein said cylindrical shaft is a molded plastic element.

20. In a drive mechanism for feeding a perforated web having a belt from which pins extend releasably into perforations in the web, said belt being entrained around at least one sprocket shaft, an improved bearing assembly for rotatably disposing said sprocket shaft in a cover provided by a framing member of said drive mechanism, which bearing assembly comprises multiple plastic needle bearings of substantially cylindrical shape radially and rotatably spaced uniformly from one another by a plastic needle separator element and temporarily attached by frangible connections to a ring, said needles, ring and separator element being contained in said cover of said framing member with said ring slidably disposed in said cover and with said separator element and needles in retained relationship within said cover, said ring being engagable by said sprocket shaft to detach said needles therefrom by breaking said frangible connections, said needles and elements being retained in said cover while said ring is ejected, said plastic needles being in rolling contact with said cover and said sprocket shaft, and said retained relationship of said needles and separator element being provided by a circular flange in said cover and by a ring-like support of said needle separator housing element.

21. The device according to claim 20, wherein said needle separator housing element is axially retained in said cover by the circular flange edge in said cover and by a flange on said sprocket shaft.

22. The device according to claim 20, wherein said drive sprocket shaft, said cover, said multiple plastic needles and said needle separator housing element are made from moldable plastics selected from the group consisting of polypropylenes and polyacetals.

23. The device according to claim 20, wherein said drive sprocket shaft is driven by an integrally molded gear.

24. The device according to claim 20, wherein said drive sprocket shaft has cylindrical sections extending to either side of said sprocket.

25. The device according to claim 24, wherein each of said cylindrical sections of said drive sprocket is rotatably disposed in a separate one of said bearing assemblies.

26. The device according to claim 20 wherein said needle bearings are molded integrally with said ring which is engagable by and severed from said needles and ejected from said assembly when said shaft is inserted into said cover.

27. A plastic bearing assembly comprising a plurality of cylindrical bearing members, a ring to which said bearing members are frangible attached at frangible connections along portions of their edges at one end thereof, an annular member providing a race around which said bearing members are disposed circumferentially spaced around said race with their said frangible connections fractured to free said bearing members to roll, means for fracturing said frangible connections upon assembly of at least said bearing members and said race, and means for ejecting said ring from said bearing members upon assembly of said bearing members and said race.

28. The bearing assembly according to claim 27 wherein said race provides an outer race of said bearing assembly.

29. The bearing assembly according to claim 27 wherein said race is an outer race having a flange with an inside diameter defining a step against which one end of said bearings are disposed with said ring being disposed within said inner diameter of said flange until fractured upon engagement by said race.

30. The bearing assembly according to claim 29 wherein said bearing members are needle bearings, a cage within said outer race for holding said needle bearings in said circumferentially spaced relationship.

* * * * *